Figure 1:
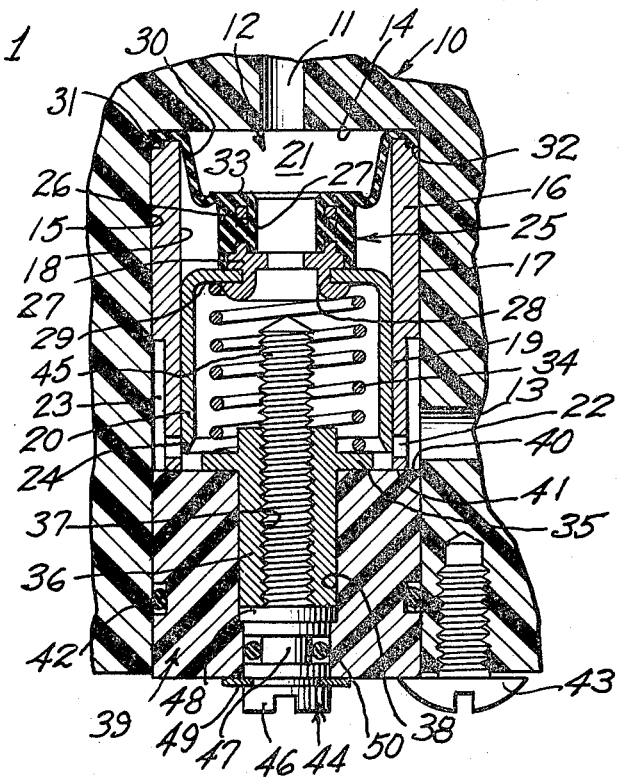

Jan. 21, 1969   H. L. ERICKSON   3,422,842

ADJUSTABLE FLOW CONTROL

Filed Nov. 16, 1966

INVENTOR.
Howard L. Erickson

BY  Hill, Sherman, Meroni, Gross & Simpson   ATTORNEYS

United States Patent Office 3,422,842
Patented Jan. 21, 1969

3,422,842
ADJUSTABLE FLOW CONTROL
Howard L. Erickson, Bensenville, Ill., assignor to The Dole Valve Company, Morton Grove, Ill., a corporation of Illinois
Filed Nov. 16, 1966, Ser. No. 594,748
U.S. Cl. 137—504      10 Claims
Int. Cl. F16k 21/04, 3/24

This invention relates to a device for regulating the rate of flow of fluid through a conduit and in particular relates to a flow control device which is adjustable to provide a variable rate of flow in response to a given fluid pressure and which acts automatically to maintain that rate of flow irrespective of changes in the fluid pressure.

Flow control devices of the type employed in this invention comprise generally a piston which is slidably movable within a chamber. The piston is biased by a spring or the like toward the inlet of the chamber, and fluid pressure applied through the inlet acts against the biasing of the spring to move the piston axially within the chamber in response to the changes in fluid pressure. The axial movement of the piston within the chamber then is utilized as a means for regulating the opening and closing of a flow port in response to the fluid pressure sensed by the piston at the inlet of the chamber.

The piston itself is generally hollow, and the flow of fluid passes from the inlet of the chamber through the interior of the piston to the outlet. The movement of the lip or edge of the piston acts as a shutter to open and close the outlet in response to changes in fluid pressure at the inlet. It is important, therefore, that the flow of fluid from the inlet be confined to the interior of the piston if the movement of that piston is to regulate the flow to the outlet. If, for instance, fluid is allowed to pass from the inlet around the exterior of the piston, the flow control characteristic of the valve will be defeated, as the fluid flow around the exterior of the piston will in effect be by-passing the valve.

To prevent fluid flow around the exterior of the piston, adjustable flow control devices have heretofore generally used sealing rings or the like which are disposed in grooves or formed on the exterior of the piston and which ride with the piston against the cylinder or casing wall to prevent the flow of fluid therebetween. However, the use of such resilient type rings about the exterior of the piston against the interior of the casing wall tends to retard the movement of the piston and make the flow control device less sensitive. This high friction generated by the sealing rings is undesirable from a point of view of wear and from a point of view of effective and sensitive valve operation.

Accordingly, it is a principal object of this invention to provide an adjustable flow control device having a hollow piston slidably and loosely mounted within an associated casing and having a substantially friction free diaphragm means for eliminating the by-passing of fluid about the exterior of the piston.

It is another object of this invention to provide an adjustable flow control device having a casing wall and a cylindrical piston slidably mounted therein and having a resilient diaphragm sealably disposed between the piston and the casing wherein the flow of fluid is permitted from the inlet of the casing through the diaphragm to the interior of the piston and to the outlet of the casing and wherein the diaphragm is connected at such points on the piston to prevent the flow of fluid about the exterior thereof.

It is an object of this invention to provide a flow control device as described above wherein the diaphragm which is secured between the movable piston and the casing is provided with a resilient boss which is substantially rigid and which is mounted to the piston about the principal flow port thereof, and wherein the diaphragm sustains flow pressure from the inlet to regulate the axial movement of the piston within the casing.

It is a further object of this invention to provide an adjustable flow control device as described above wherein the resilient boss of the diaphragm has a substantially large area facing the inlet of the casing and wherein a flexible web portion of the diaphragm is formed integrally with the boss and secured firmly to the casing in such a manner as to minimize strain thereon due to fluid pressure at the inlet and thereby maximize the life span of the diaphragm.

Figure 2:
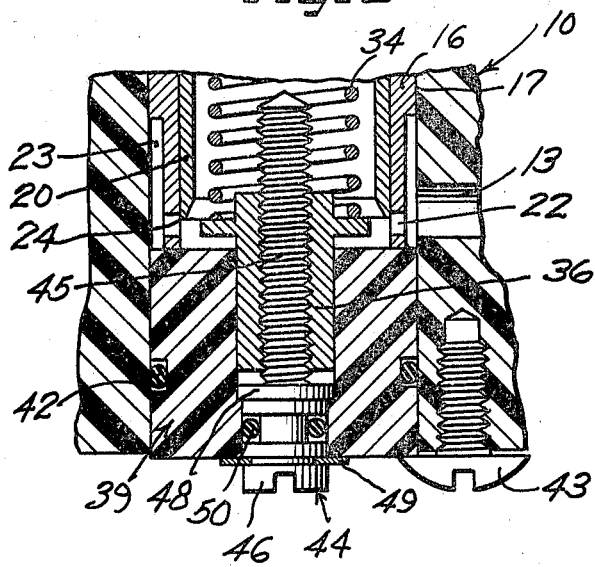

These and other objects, features and advantages of the present invention will be understood in greater detail from the following description and the associated drawing wherein reference numerals are utilized in designating an illustrative embodiment and wherein:

FIGURE 1 is a sectional view through an adjustable flow control device according to this invention, and FIGURE 2 is a partial view similar to FIGURE 1 and showing the movable piston thereof in an adjusted position.

An adjustable flow control device according to this invention is shown generally in FIGURE 1 as being mounted within a housing 10 having an inlet 11, a flow control chamber 12 and an outlet 13. It will be understood that the housing 10 may be a flow conduit or other member through which automatic and adjustable flow regulation is desired.

The housing 10 has an end wall 14 and a cylindrical wall 15 defining the flow chamber 12. The end wall 14 is generally flat in configuration, and the cylindrical wall 15 preferably has a round cross section.

A casing 16 which is also preferably cylindrical having a round cross section and having an outer surface 17 cooperably with the cylindrical surface 15 of the flow chamber 12 to form a uniformly tight fit therebetween. The casing 16 also has an inner cylindrical surface 18 which is cooperable with the outer cylindrical surface 19 of a piston 20.

The piston 20 is slidably mounted within the casing 16 and is the valve means of this invention.

The casing 16 has an inlet 21 and an outlet 22. The inlet 21 is disposed adjacent to the inlet 11 of the housing 10, and the outlet 22 is disposed adjacent the outlet 13 of the housing 10. The outlet 22 comprises a slit formed within the lower edge of the casing 16, and by controlling the rate of flow of fluid through the slit, the flow rate between the inlet 11 and the outlet 13 is thereby controlled. To minimize the axial depth of the slit 22 while maximizing the flow capacity thereof, a secondary slit or channel 23 is formed at the outer surface of the casing 16. The slit 23 communicates directly with the outlet 13, and in this way, a large effective flow area of the slit 22 can be utilized.

By axially moving the piston 20 within the casing 16, an edge or lip thereof 24 is caused to overlie the slit or outlet 22 and thereby regulate the effective flow area thereof. Due to the configuration of the slit 22 and to the cooperation of the slit 23, only a slight axial movement of the piston 20 can accomplish a substantial reduction in the effective flow area of the outlet.

The piston 20 has a substantially uniform wall thickness throughout and is freely slidable within the casing 16 without being inhibited by the presence of seal rings or the like between the outer surface 19 of the piston 20 and the inner surface 18 of the casing 16. Since, however, it is necessary to prevent the flow of fluid from the inlet 11 around the exterior of the piston 20, means must be provided to movably seal the piston 20 to the casing 16. Such a means herein takes the form of a diaphragm 25.

The diaphragm 25 has a boss 26 which has a central flow port 27. The boss 26 is reinforced by a metal grommet 27 and is thereby secured to an opening 28 formed centrally within a right angle portion 29 of the piston 20. Due to the large mass of the boss 26 and due to the presence of the metal grommet 27 embedded therein, the boss is substantially rigid and will not deform due to fluid pressure applied thereto through the inlet 11.

The diaphragm 25 also has a flexible web portion 30 which is formed integrally with the boss 26 and which has a peripheral bead 31 for locking the flexible web 30 to the casing 16. For this purpose, the casing 16 is provided with a cylindrical notch 32, and the bead 31 fits into the notch and is compressed between the end of the casing 16 and the end wall 14 of the housing 10.

The boss 26 has a substantially large area 33 facing the inlet 11, and the flexible web 30 is orientated around the boss so as to be substantially parallel to the direction of movement of fluid at the inlet 11. In this way, strain on the web 30 is minimized.

The piston 20 is biased against the action of fluid pressure from the inlet 11 by a coil spring 34 which is seated at one end against the wall portion 29 of the piston 20 and at the other end against a spring seat 35. The spring seat 35 is formed integrally with a shaft member 36 which is internally threaded as at 37 and which is carried within a bore 38 which, in turn, is formed within a plug member 39. The plug member 39 is inserted within the cylindrical wall 15 of the housing 10 and has a face 40 which engages the end face 41 of the casing 16 to compress the casing 16 and the bead 31 of the diaphragm 25 against the end wall 14 of the housing 10. The plug 39 is sealed to the housing 10 through the provision for a cylindrical groove and seal ring 42. The plug is maintained in position within the cylindrical wall 15 of the housing 10 by means of a fixture such as a screw 43.

An adjustment pin or screw 44 has a shaft 45 and a head 46 and a seal collar 47. The shaft 45 is threadedly received within the surface 37 of the spring seat member 35, and the head 46 is axially locked within the plug member 39 through the provision for a collar 48 and a flange 49 as will be understood from the drawing. A seal ring 50 is fitted about the seal collar 47 and permits the flow of fluid around the adjustment screw 44.

In operation, fluid pressure applied through the inlet 11 acts against the exposed surface of the diaphragm 25 and tends to move the diaphragm and piston 20 in a direction toward the outlet 22. However, the action of the spring 34 tends to resist the movement of the diaphragm in accordance with the spring constant thereof. Accordingly a point will be reached where the fluid pressure acting on the diaphragm is exactly balanced by the spring 34 and a given flow rate will result. If the fluid pressure increases, the diaphragm and piston member will be moved toward the outlet 22 for causing the edge 24 of the piston 20 to further overlie the outlet 22 and thereby reduce the effective flow area to maintain the rate of flow substantially constant.

If the rate of flow is desired to be changed, the screw 44 is adjusted to increase the compression against the biasing force of the spring 34. By turning the screw shaft 45, the spring seat 35 which is threaded thereto may be lifted for increasing the bias on the spring 34, thereby increasing the fluid pressure which must be available to effect a given movement of the shutter edge 24 of the piston 20.

It will be understood that various modifications and combinations of the features of this invention may be accomplished by those versed in the art, but I desire to claim all such modifications and combinations as properly come within the spirit and scope of my invention.

I claim as my invention:

1. An adjustable flow control comprising:
    a generally hollow casing having an inlet and an outlet,
    a piston slidably mounted within said casing and having an opening formed therein to allow the flow of fluid from the inlet to the outlet and having an edge thereof cooperable with said outlet for regulating the rate of flow of fluid therethrough in accordance with the axial position of the piston within the casing,
    a resilient diaphragm operably and sealably secured between the piston and the casing at the vicinity of said inlet to prevent the flow of fluid from the inlet about the exterior of the piston to the outlet, said diaphragm having a port formed therein, said port being communicable with the opening in said piston to allow the flow of fluid from the inlet through the interior of the piston to the outlet, and
    means biasing said piston toward said inlet.

2. An adjustable flow control device in accordance with claim 1 wherein said resilient diaphragm comprises a substantially rigid boss secured to the piston about the opening thereof and wherein said diaphragm has a flexible web portion between the boss and the point of connection at the casing to allow the piston to move substantially friction free axially within said casing.

3. An adjustable flow control device in accordance with claim 2 wherein said substantially rigid boss is formed integrally with said flexible web and wherein said boss has a rigidifying grommet means embedded therein to enable the secure attachment of the boss to the piston and to prevent flexing of the boss in response to changes in fluid pressure applied thereto.

4. An adjustable flow control device in accordance with claim 2 wherein said biasing means comprises a spring seat member disposed at the outlet side of the casing and a coil spring operably disposed between the spring seat and the interior of the piston to bias the piston in a general direction toward the inlet,
    said spring seat having a threaded bore formed therein, and a threaded shaft rotatably positioned within the spring seat bore and axially fixed relative to the casing.

5. An adjustable flow control device comprising:
    a housing having a flow control chamber and an inlet and an outlet,
    an end wall formed about the inlet,
    a casing disposed within the flow control chamber and having a generally cylindrical hollow interior and having an inlet formed adjacent the housing inlet and an outlet formed adjacent the housing outlet, a generally cylindrical hollow piston slidably mounted within the interior of the casing and having an edge thereof cooperable with the outlet to regulate the flow of fluid therethrough,
    said piston having an opening adjacent the inlet of the casing to allow the flow of fluid therethrough,
    a resilient diaphragm having a central boss and a peripheral bead and a flexible web formed between the boss and the bead,
    said boss having an opening therein and being secured to the piston about the opening thereof,
    said bead being sandwiched between an end wall of the casing and the end wall of the housing, whereby a seal is provided between the housing, casing and piston and whereby said seal is maintained during slidable movement of the piston, and means biasing said piston toward said inlet.

6. An adjustable flow control device in accordance with claim 5 wherein a groove is formed in the end wall of the casing, and wherein said bead is disposed within said groove to lock the diaphragm into a fixed position to accurately monitor fluid pressure applied thereto.

7. An adjustable flow control device in accordance with claim 5 wherein the outlet of said casing comprises a generally cylindrical substantially narrow slit formed in the wall thereof adjacent the outlet of said housing and wherein axial movement of the piston within the casing causes said edge thereof to variably overlie said outlet, thereby adjusting the rate of flow of fluid therethrough.

8. An adjustable flow control device in accordance with claim 5 wherein said piston comprises a cylindrical sleeve having one end thereof opened to a maximum diameter and having the other end thereof partially closed to form said opening therein and wherein the exterior surface of the sleeve is loosely, nonsealably filled within the casing.

9. An adjustable flow control device in accordance with claim 5 wherein said boss of said diaphragm has a substantially large surface facing said inlet and wherein said web portion is constrained to lie substantially adjacent to the inner side walls of the casing.

10. An adjustable flow control device comprising:
a generally cylindrical hollow casing having an inlet and an outlet,
a generally cylindrical hollow piston slidably mounted for axial movement within the casing and having an edge cooperable with the outlet to control the rate of fluid therethrough in accordance with the axial position of the piston relative to the casing,
means biasing the piston toward the inlet, and a resilient diaphragm operably secured between the casing and the movable piston at such points thereon to allow the flow of fluid from the inlet through the interior of the piston and to prevent the flow from the inlet about the exterior of the piston and to be pressure responsive to fluid at the inlet to control the axial position of the piston.

References Cited

UNITED STATES PATENTS

| | | | |
|---|---|---|---|
| 2,845,087 | 7/1958 | Thomas | 137—504 |
| 2,984,261 | 5/1961 | Kates | 137—504 |
| 3,120,243 | 2/1964 | Allen et al. | 137—504 |

M. CARY NELSON, *Primary Examiner.*

R. J. MILLER, *Assistant Examiner.*